US007054708B1

(12) United States Patent
Aamodt et al.

(10) Patent No.: US 7,054,708 B1
(45) Date of Patent: May 30, 2006

(54) SHEET MATERIAL CUTTING SYSTEM AND METHODS REGARDING SAME

(75) Inventors: Jennifer Mary Aamodt, Woodbury, MN (US); Olinda Jane Kober, St. Paul, MN (US)

(73) Assignee: Xyron, Inc., Scottsdale, AZ (US)

( * ) Notice: Subject to any disclaimer, the term of this patent is extended or adjusted under 35 U.S.C. 154(b) by 0 days.

(21) Appl. No.: 10/983,200

(22) Filed: Nov. 5, 2004

Related U.S. Application Data

(60) Provisional application No. 60/517,550, filed on Nov. 5, 2003.

(51) Int. Cl.
*G06F 19/00* (2006.01)

(52) U.S. Cl. ...................................... 700/122; 700/134

(58) Field of Classification Search ................ 700/122, 700/125, 127, 128, 134, 135, 167, 168, 180, 700/183
See application file for complete search history.

(56) References Cited

U.S. PATENT DOCUMENTS

| | | | | | |
|---|---|---|---|---|---|
| 1,375,721 | A | | 4/1921 | Nichols | 83/552 |
| 2,477,986 | A | | 8/1949 | Kennerly | 30/162 |
| 2,483,750 | A | | 10/1949 | Bratrud | 30/162 |
| 2,702,496 | A | | 2/1955 | Davis et al. | 409/124 |
| 2,941,511 | A | | 6/1960 | Cieremans | 401/116 |
| 3,130,622 | A | | 4/1964 | Eno | 83/529 |
| 3,166,844 | A | | 1/1965 | Pascoe et al. | 33/1 M |
| 3,166,846 | A | | 1/1965 | Pascoe et al. | 33/1 M |
| 3,776,072 | A | | 12/1973 | Gerber et al. | 83/34 |
| 3,777,616 | A | | 12/1973 | Mueller | 409/109 |
| 3,805,650 | A | | 4/1974 | Pearl | 83/56 |
| 3,864,997 | A | | 2/1975 | Pearl et al. | 83/49 |
| 4,002,366 | A | | 1/1977 | Hammes | 294/26 |
| 4,047,457 | A | | 9/1977 | Stubbings | 83/76.8 |
| 4,060,016 | A | | 11/1977 | Gerber | 83/451 |
| 4,103,580 | A | | 8/1978 | Sauer et al. | 83/663 |
| 4,133,234 | A | | 1/1979 | Gerber | 83/56 |
| 4,331,051 | A | | 5/1982 | Gerber et al. | 83/74 |
| 4,337,576 | A | | 7/1982 | Drost et al. | 30/162 |
| 4,367,588 | A | | 1/1983 | Herbert | 33/1 M |
| 4,393,450 | A | | 7/1983 | Jerard | 700/163 |
| 4,430,718 | A | | 2/1984 | Hendren | 700/163 |
| 4,436,013 | A | | 3/1984 | Gerber | 83/747 |
| 4,467,525 | A | * | 8/1984 | Logan et al. | 33/18.2 |
| 4,505,174 | A | | 3/1985 | Carithers, Jr. | 83/455 |
| 4,512,839 | A | * | 4/1985 | Gerber | 156/248 |
| 4,524,894 | A | | 6/1985 | Leblond | 225/2 |
| 4,537,582 | A | | 8/1985 | Liu | 493/38 |
| 4,577,539 | A | | 3/1986 | Bonacci | 83/886 |
| 4,641,556 | A | | 2/1987 | Vigneron et al. | 83/36 |

(Continued)

FOREIGN PATENT DOCUMENTS

EP 1557246 A2 7/2005

(Continued)

OTHER PUBLICATIONS

Craft ROBO Users Manual, Manual No. CC100-UM-152, 1st Edition, Issued Aug. 10, 2004.

(Continued)

*Primary Examiner*—Leo Picard
*Assistant Examiner*—Chad Rapp
(74) *Attorney, Agent, or Firm*—Pillsbury Winthrop Shaw Pittman, LLP

(57) ABSTRACT

A system and/or method for cutting designs of text and/or shapes out of sheet material, such as paper, vellum, and other materials used in, for example, the scrapbooking and card making industries.

11 Claims, 7 Drawing Sheets

U.S. PATENT DOCUMENTS

| | | | | |
|---|---|---|---|---|
| 4,675,825 A | | 6/1987 | DeMenthon | 700/160 |
| 4,682,401 A | | 7/1987 | Tadahshi et al. | 483/14 |
| 4,709,483 A | | 12/1987 | Hembree et al. | 33/18.1 |
| 4,713,886 A | | 12/1987 | Ikeda | 30/366 |
| 4,793,033 A | | 12/1988 | Schneider et al. | 26/16 |
| 4,794,698 A | | 1/1989 | Fassett, II | 33/18.1 |
| 4,841,822 A | | 6/1989 | Gerber | 83/174 |
| 4,856,197 A | | 8/1989 | Auer et al. | 33/18.1 |
| 4,868,761 A | | 9/1989 | Hayashi | 700/182 |
| 4,909,884 A | * | 3/1990 | Wormser | 156/248 |
| 4,920,495 A | | 4/1990 | Pilkington | 700/195 |
| 4,949,466 A | | 8/1990 | Auer et al. | 33/18.1 |
| 5,031,483 A | | 7/1991 | Weaver | 76/102.1 |
| 5,042,338 A | | 8/1991 | Gerber | 83/34 |
| 5,042,339 A | | 8/1991 | Gerber | 83/49 |
| 5,074,178 A | | 12/1991 | Shetley et al. | 83/47 |
| 5,094,134 A | | 3/1992 | Mizukoshi | 83/698.21 |
| 5,134,911 A | | 8/1992 | Busky et al. | 83/34 |
| 5,163,759 A | * | 11/1992 | Jambor et al. | 400/29 |
| 5,175,689 A | | 12/1992 | Matsushita et al. | 700/187 |
| 5,188,009 A | | 2/1993 | Sunohara et al. | 83/13 |
| 5,197,198 A | | 3/1993 | Onozato | 33/18.1 |
| 5,214,590 A | | 5/1993 | Schnetzer | 700/171 |
| 5,253,176 A | | 10/1993 | ToDoroki et al. | 700/114 |
| 5,353,232 A | | 10/1994 | Vollmayr | 700/187 |
| 5,353,355 A | | 10/1994 | Takagi et al. | 382/111 |
| 5,388,488 A | | 2/1995 | Geidl et al. | 252/373 |
| 5,396,160 A | | 3/1995 | Chen | 318/373 |
| 5,398,579 A | | 3/1995 | Bando | 83/879 |
| 5,407,415 A | | 4/1995 | Spishak | 483/4 |
| 5,438,896 A | | 8/1995 | Carroll | 83/76.1 |
| 5,454,287 A | | 10/1995 | Fuchigami et al. | 83/881 |
| 5,466,501 A | * | 11/1995 | Logan et al. | 428/41.9 |
| 5,495,671 A | | 3/1996 | Shun-Yi | 30/364 |
| 5,517,407 A | | 5/1996 | Weiner | 704/1 |
| 5,537,904 A | | 7/1996 | Albin | 83/455 |
| 5,547,003 A | | 8/1996 | Susnjara et al. | 144/368 |
| 5,561,601 A | | 10/1996 | Inoue et al. | 700/182 |
| 5,595,560 A | | 1/1997 | Kamada | 483/1 |
| 5,634,388 A | | 6/1997 | Fuchigami et al. | 83/881 |
| 5,669,866 A | | 9/1997 | Julian et al. | 483/1 |
| 5,701,251 A | | 12/1997 | Yoshimura | 700/182 |
| 5,727,433 A | | 3/1998 | Pomerleau et al. | 83/29 |
| 5,777,880 A | | 7/1998 | Bowen et al. | 700/143 |
| 5,791,215 A | | 8/1998 | Morrison et al. | 83/13 |
| 5,806,390 A | | 9/1998 | Pomerleau et al. | 83/29 |
| 5,832,801 A | | 11/1998 | Bando | 83/483 |
| 5,847,956 A | | 12/1998 | Bronfeld et al. | 700/98 |
| 5,855,149 A | | 1/1999 | Islam et al. | 76/107.8 |
| 5,857,398 A | | 1/1999 | Bando | 83/879 |
| 5,868,056 A | | 2/1999 | Pfarr et al. | 83/578 |
| 6,021,572 A | | 2/2000 | Smith | 30/368 |
| 6,173,211 B1 | | 1/2001 | Williams et al. | 700/131 |
| 6,266,572 B1 | | 7/2001 | Yamazaki et al. | 700/96 |
| 6,363,298 B1 | | 3/2002 | Shin et al. | 700/160 |
| 6,441,338 B1 | | 8/2002 | Rabinovich | 219/121.64 |
| 6,459,952 B1 | | 10/2002 | Dundorf | 700/182 |
| 6,491,361 B1 | * | 12/2002 | Spann | 347/2 |
| 6,499,840 B1 | * | 12/2002 | Day et al. | 347/100 |
| 6,547,098 B1 | | 4/2003 | Kaye | 222/80 |
| 6,554,163 B1 | | 4/2003 | Kaye | 222/80 |
| 6,557,730 B1 | | 5/2003 | Kaye | 222/80 |
| 6,560,499 B1 | | 5/2003 | Demmer | 700/97 |
| 6,608,618 B1 | | 8/2003 | Wood et al. | 345/173 |
| 6,619,166 B1 | | 9/2003 | Miyazaki et al. | 83/13 |
| RE38,286 E | | 10/2003 | Flowers | 170/18.01 |
| 6,635,001 B1 | | 10/2003 | Lynch et al. | 493/22 |
| 6,641,401 B1 | | 11/2003 | Wood et al. | 424/159 |
| 6,668,156 B1 | | 12/2003 | Lynch et al. | 434/317 |
| 6,675,059 B1 | | 1/2004 | Scott | 700/166 |
| 6,677,021 B1 | * | 1/2004 | Barnette et al. | 428/40.1 |
| 6,684,514 B1 | | 2/2004 | Welch | 30/367 |
| 6,711,854 B1 | | 3/2004 | Andersen | 82/118 |
| 6,750,978 B1 | | 6/2004 | Marggraff et al. | 358/1.12 |
| 6,830,304 B1 | | 12/2004 | Suzuki et al. | 347/9 |
| 6,887,003 B1 | | 5/2005 | Someno | 400/621 |
| 2002/0066344 A1 | | 6/2002 | Ewing et al. | 83/34 |
| 2002/0187285 A1 | * | 12/2002 | Mitchell et al. | 428/7 |
| 2003/0012454 A1 | * | 1/2003 | Manico et al. | 382/282 |
| 2003/0118229 A1 | | 6/2003 | Andrews et al. | 382/141 |
| 2004/0043365 A1 | | 3/2004 | Kelley et al. | 434/178 |
| 2004/0094003 A1 | | 5/2004 | Bar-Erez | 83/13 |
| 2004/0101337 A1 | | 5/2004 | Woodman et al. | 400/76 |
| 2005/0186010 A1 | | 8/2005 | Shibata et al. | 400/621 |

FOREIGN PATENT DOCUMENTS

| | | |
|---|---|---|
| JP | 59206904 | 11/1984 |
| JP | 60179804 | 9/1985 |
| JP | 61004647 | 1/1986 |
| JP | 62169209 | 7/1987 |
| JP | 01295718 | 11/1989 |
| JP | 02205975 | 8/1990 |
| JP | 02287803 | 11/1990 |
| JP | 04066232 | 3/1992 |
| JP | 4293000 | 10/1992 |
| JP | 5168773 | 7/1993 |
| JP | 5305599 | 11/1993 |
| JP | 8052685 | 2/1996 |
| JP | 8066894 | 3/1996 |
| JP | 8071980 | 3/1996 |
| JP | 9323296 | 12/1997 |
| JP | 10034589 | 2/1998 |
| JP | 2003316407 | 11/2003 |

OTHER PUBLICATIONS

ROBO Masters Users Manual, Manual No. OPS656-UM-151, 1st Edition, Issued Aug. 13, 2004.

Craft ROBO Data Sheet, (1 page) Retrieved from the Internet on Oct. 27, 2004 at http://craftrobo.jp Japanese (Copyright 2004).

Craft-ROBO Data Sheet, (1 page) Retrieved from the Internet on Oct. 27, 2004 at http://168.144.45.20/craft-robo Instanbul.

Craft ROBO Software Data Sheet, (2 pages) Retrieved from the Internet on Jun. 22, 2005 at http://www.graphteccorp.com/craftrobo/things/software Copyright 2004.

Craft ROBO Data Sheet, What is Craft ROBO? (5 pages) Retrieved from the Internet on Jun. 22, 2005 at http://www.graphteccorp.com/craftrobo/about Copyright 2004.

MagiCut International—Craft ROBO Cutting Plotter Data Sheet, (2 pages) Retrieved from the Internet on Jun. 22, 2005 at http://www.magicut.co.uk/news/robo Copyright 2004.

CraftROBO:GRAPHTEC Data Sheet, (1 page) Retrieved from the Internet on Jun. 22, 2005 at http://www.graphtec-corp.com/craftrobo/index Copyright 2004.

ProvoCraft product information (8 pages) Retrieved from the Internet on Aug. 3, 2005 at http://www.provocraft.com/products/.

Pazzles product information (4 pages) Retrieved from the Internet on Aug. 25, 2005 at http://www.pazzles.com/ideabook.htm.

Craft & Hobby Association 2005 Summer Convention and Trade Show brochure (1 page), Jul. 15-17, 2005.

* cited by examiner

SHEET MATERIAL CUTTING SYSTEM AND METHODS REGARDING SAME

CROSS-REFERENCE TO RELATED APPLICATIONS

This application claims the benefit of U.S. Provisional Application Ser. No. 60/517,550, filed Nov. 5, 2003, which is incorporated herein by reference in its entirety.

BACKGROUND OF THE INVENTION

The art of cutting shapes, words, letters, and graphics from vinyl substrates on a backing is known in the sign making industry. In addition, cutters have been designed for textiles to allow pattern shapes to be cut automatically for industrial garment applications. These industrial cutters are typically blades mounted on a plotter-type apparatus that allows the blade to move in the y- and z-directions with the vinyl substrate or textile moving in the x-direction. For example, one such cutter is disclosed in U.S. Pat. No. 6,491,361 to Spann entitled "Digital Media Cutter," issued 10 Dec. 2002, which combines an inkjet printer with a laser cutter to allow printing and cutting of, for example, vinyl and textiles.

Further, U.S. Pat. No. 6,499,840 B2 to Day et al. entitled "Multi-functional Printer," issued 31 Dec. 2002, shows a hand held printer and cutter device, which is connected by a cable to a base that is connected to a computer. This printer and cutter device is designed to cut stencil material or etch glass and metal plates. Yet further, U.S. Patent Application Publication US 2003/0012454 A1 to Manico et al. entitled "Custom Cut Image Products," published 16 Jan. 2003 allows a consumer to identify an image they would like cut and place an order over a communication network to have the image cut at a production facility.

In general, previous cutters are generally designed such that an individual consumer could not operate the cutting device without extensive training. Such cutters are generally industrial in nature and intended to be used in the industry's manufacturing environment. Further, technology in the sign making industry has been directed toward faster, wider cutting operations. These cutters are directed by complicated drawing software in which the user must create non-geometric figures and/or lines to be sent to the cutter for use in cutting the desired material.

Cutting of non-geometric shapes, letters, and numbers is desired by individuals in the scrapbooking, card making, and education industries. Individuals in the scrapbooking, card making, education and related industries require sophisticated and intricate letters, numbers and graphics.

For example, the process of making a unique scrapbook page or card requires the scrapbooker to choose colors, patterns, and a design format for the page they are making. Currently, stickers, industrially cut shapes and words, and personal die cutting systems are available. The stickers and industrially cut shapes and letters pre-determine the color, font, and pattern schemes available for use on a page. The personal die cutting systems allow the user to choose paper and shapes to make a unique page but can be bulky to store and transport, are expensive to expand when more choice is desired (e.g., adding additional fonts, letter sizes, different shapes, etc.), and are very manual and time consuming to use. Further, individuals who scrapbook and make cards often leave their homes to work on their projects.

SUMMARY OF THE INVENTION

A method for cutting sheet material (e.g., cutting text or shapes from paper for making a scrapbook) according to the present invention includes providing a cutting apparatus operable to cut sheet material along one or more cut lines under control of a processing apparatus. Further, a plurality of predefined shapes (e.g., predefined non-geometric shapes) with one or more associated predefined cut lines are stored on readable media. A user interface allows a user to insert at least one shape in a graphical design using the plurality of predefined shapes. The graphical design is defined by one or more cut lines based on the one or more cut lines associated with the plurality of predefined shapes. Sheet material is inserted into the cutting apparatus (e.g., a cutting apparatus configured to receive sheet material having a size equal to, but no more than, 10 inches wide) and the graphical design defined by the cut lines is cut under control of a cut signal generated by the processing apparatus that is representative of the one or more cut lines defined for the graphical design.

In one embodiment, one or more predefined fonts are stored with one or more associated predefined cut lines on the readable media. Further, the user interface allows a user to insert at least one of text and a shape in a graphical design using the one or more predefined fonts and the plurality of predefined shapes. The graphical design is defined by one or more cut lines based on the one or more cut lines associated with the one or more predefined fonts and plurality of predefined shapes.

Further, in one embodiment, the processing apparatus, the cutting apparatus, and the user interface are integrated with or within a housing to form a standalone cutting apparatus.

Yet further, in another embodiment, the processing apparatus includes a handheld processing apparatus operable to present the user interface to the user.

In another embodiment of the method, allowing the user to insert at least one shape in the graphical design includes presenting the plurality of predefined shapes available and selecting a presented predefined shape to be inserted; or the shape may be sized by dragging a portion of an insertion region in which the shape is presented to the user.

In yet another embodiment, cutting the graphical design defined by the cut lines further includes compressing at least a portion of the sheet material corresponding to the cut line prior to cutting.

In another embodiment of the method, a plurality of storage media are provided; wherein each storage media includes at least one group of related predefined non-geometric shapes. At least one of the storage media may further include at least one predefined font.

A portable system for cutting sheet material according to the present invention is also described. The system includes a housing configured to accept sheet material and a user interface integrated with or within the housing that allows a user to define a graphical design that is to be cut from the sheet material. A processing apparatus is also integrated with or within the housing that is operable to generate a cutting signal based on the graphical design defined by the user. Yet further, a cutting apparatus is also integrated with or within the housing operable to cut the sheet material under control of the processing apparatus based on the cutting signal.

In one embodiment of the system, an information storage media system is also integrated with or within the housing that allows a user to insert media into the graphical design.

In other embodiments of the system, at least one of one or more predefined fonts and a plurality of predefined non-geometric shapes are stored on a plurality of storage media operable with the information storage media system for access by the processing apparatus, and further, the portable system may be a standalone cutting system that weighs less than about 20 lbs.

Another method for cutting sheet material is also described. The method includes providing a cutting apparatus operable to cut sheet material under control of a processing apparatus. At least one of one or more predefined fonts and a plurality of predefined shapes are stored on readable media with one or more associated predefined cut lines and one or more predefined emboss lines. A user interface is provided that allows a user to insert at least one of text and one or more shapes in a graphical design using the predefined fonts and/or the plurality of predefined shapes; the graphical design is defined by one or more cut lines and one or more emboss lines based on the one or more cut lines and the one or more emboss lines associated with the one or more predefined fonts and the plurality of predefined shapes. Sheet material is inserted into the cutting apparatus. The sheet material is compressed (e.g., embossed) under control of a compress signal generated by the processing apparatus that is representative of the one or more emboss lines defined for the graphical design. The graphical design defined by the cut lines is cut under control of a cut signal generated by the processing apparatus that is representative of the one or more cut lines defined for the graphical design.

In various embodiments, systems for implementing the compression and cutting method described herein may be provided. Further, the compression (e.g., embossing) and cutting functions may be implemented together or separately.

A storage media associated with an information storage system accessible under control of a processing apparatus using a user interface is also provided. The storage media includes a plurality of predefined shapes stored with one or more associated predefined cut lines. The one or more cut lines accessible by the processing apparatus are for use in generation of a cut signal for use in cutting a graphical design from sheet material.

In various embodiments of the storage media, the storage media may include emboss lines either with the cut lines or alone.

The above summary of the present invention is not intended to describe each embodiment or every implementation of the present invention. Advantages, together with a more complete understanding of the invention, will become apparent and appreciated by referring to the following detailed description and claims taken in conjunction with the accompanying drawings.

DETAILED DESCRIPTION OF THE EMBODIMENTS

The present invention relates to apparatus, and methods/systems related thereto, for cutting and/or scoring designs including, but not limited to, shapes, graphics, letters, numbers, and words out of paper (e.g., 8½ inches by 11 inches, A-4, etc.), vellum, and other sheet materials used in the scrapbooking, card making, and related industries. As used herein, the term cutting, unless otherwise indicated, shall for simplicity refer to both cutting and scoring of one or more materials (e.g., completely separating portions of a paper, partially separating portions of paper by removal of sufficient material thereof such that, for example, the portions can thereafter be completely separated, making a superficial cut or crease such that, for example, a paper may be folded, torn, or separated more easily, etc.). Further, one or more embodiments of the present invention may be used for compression of sheet materials, such as, for example, in the cutting process or in an embossing process.

Further, at least in one embodiment, sheet material refers to sheet type materials comprising one or more layers, but having a thickness of less than about 0.020 inches. Such sheet type materials include at least printed paper, cardstock, and vellum, but is clearly not limited thereto.

At least in one embodiment, sheet material does not include vinyl or textiles. Further, at least in another embodiment, sheet material does not include materials having a length that exceeds 39 inches, or materials that would be used in a continuous feed type system. In another embodiment, the sheet material has a length that is 20 inches or less. Yet further, in one embodiment, the sheet material has a size equal to, but no more than 10 inches wide. Still further, in at least one embodiment, the sheet material includes material having a size equal to 12 inches by 12 inches, or less (e.g., paper size common in the scrapbook preparation industry).

Figure 1:
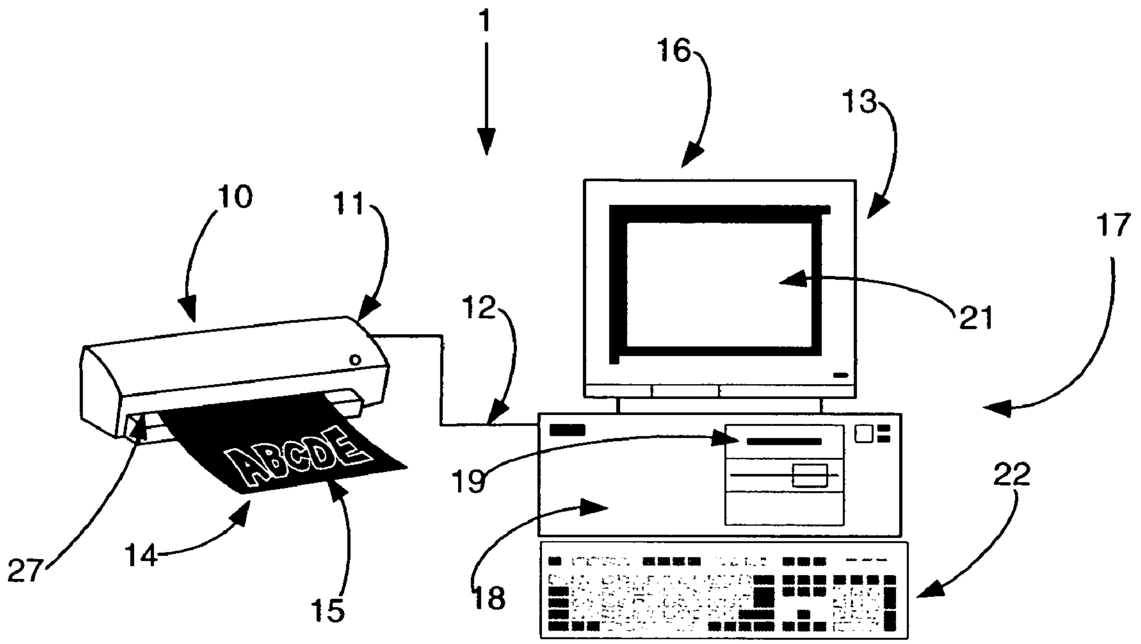
FIG. 1 is a schematic diagram of a portable paper cutting apparatus for use in producing custom cut images that is connected to a personal computer (e.g., an external peripheral device) to provide a cutting system in accordance with the present invention.

A cutting apparatus (e.g., cutting apparatus 10 shown in FIG. 1) as described herein may receive information for cutting materials from an external peripheral device, such as a computer processing apparatus (e.g., the personal computer 16 of FIG. 1) or handheld processing device (e.g., device 124 shown in FIG. 7), so as to provide a cutting system (e.g., cutting system 1 as shown in FIG. 1). However, as described herein, a standalone cutting system (e.g., such as cutting system 150 shown in FIG. 8A) that includes the cutting apparatus and other necessary system processing components within a single housing to provide portability, is also provided according to the present invention.

FIG. 1 shows one illustrative embodiment of a cutting system 1 including a portable cutting apparatus 10 according to the present invention associated with an external peripheral device 13 for use in controlling operation of the cutting apparatus 10. As shown in FIG. 1, the portable cutting apparatus 10 is connected by any transmission line or medium 12, e.g., cable or wireless, to external peripheral device 13. Paper 14 is fed into a paper input/output opening 27 defined in housing 11 of the cutting apparatus 10, whereby the portable cutting apparatus 10 cuts out a desired design 15, e.g., string of characters, from the paper 14. The desired design 15 may include, but is not limited to, shapes (e.g., non-geometric shapes), graphics, letters, numbers, and words, as is further described herein. The paper cut by the apparatus 10 is then fed out of the cutting apparatus 10 via paper input/output opening 27.

The external peripheral device 13 shown in FIG. 1 includes a personal computer 16. The personal computer 16 provides a user interface 17 which allows a user to create a graphical design. The personal computer 16 shown generally in FIG. 1 includes processing apparatus 18, and an information storage system 19, e.g., a media drive. Further, the user interface 17 includes a display or screen 21 and a keyboard/mouse 22.

Figure 8A:
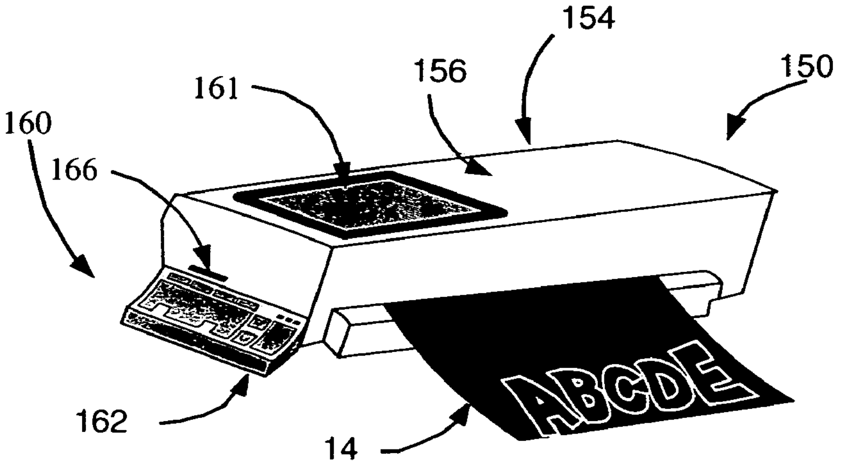
FIG. 8A is a schematic diagram of an independently operating embodiment of a portable paper cutting system for use in producing custom cut images in accordance with the present invention, wherein components of the external peripheral device (e.g., see FIG. 1) are located within a cutter housing such that a standalone system is provided.

In one or more embodiments of the present invention, the external peripheral device 13 (and/or the processing components of the standalone system as shown in FIG. 8A) may be implemented using one or more computer programs executed on programmable computers, such as computers that include, for example, processing capabilities, data storage (e.g., volatile or non-volatile memory and/or storage elements), input devices, and output devices. Program code and/or logic described herein is applied to input data to perform functionality described herein and generate desired output information. The output information may be applied as input to one or more other devices and/or processes as described herein (e.g., the cutting apparatus or process).

The program used to implement the present invention may be provided using any programmable language, e.g., a high level procedural and/or object orientated programming language, that is suitable for communicating with a computer system. Any such programs may, for example, be stored on any suitable device, e.g., a storage media, readable by a general or special purpose program, computer or a processor apparatus for configuring and operating the computer when the suitable device is read for performing the procedures described herein. In other words, at least in one embodiment, the cutting system 1 may be implemented using a computer readable storage medium, configured with a computer program, where the storage medium so configured causes the computer to operate in a specific and predefined manner to perform functions described herein.

The external peripheral device 13 (e.g., including the processing apparatus 18), may be, for example, any fixed or mobile computer system (e.g., a personal computer or minicomputer). The exact configuration of the computing apparatus is not limiting and essentially any device capable of providing suitable computing capabilities may be used according to the present invention. However, various configurations of the computing apparatus 18 and the cutting apparatus 10 (e.g., standalone configurations) may provide beneficial properties, such as overall portability, less weight, etc. Further, various other peripheral devices, such as one or more different displays, a wireless mouse, a wireless keyboard, memory, a printer, etc., are contemplated to be used in combination with processing apparatus 18 of the cutting system 1.

In view of the above, it will be readily apparent that the functionality as described in one or more embodiments according to the present invention may be implemented in any manner as would be known to one skilled in the art. As such, the computer language, the computer system, or any other software/hardware which is to be used to implement the present invention shall not be limiting on the scope of one or more embodiments of various processes or programs (e.g., the functionality provided by such processes or programs) described herein.

One will recognize that a graphical user interface, is used in conjunction with the embodiments described herein. The user interface may provide various features allowing for user input thereto, change of input, importation or exportation of files, or any other features that may be generally suitable for use with the processes described herein. For example, the user interface may allow a user to only perform certain functions to implement a simplified cutting system.

The transmission line 12 may be provided by any suitable way of transferring information between the external peripheral device 13 and the cutting apparatus 10. For example, the transmission line 12 may include wireless interfaces, cables, etc.

Via the user interface 17, a user directs the processing apparatus 18 to access stored information related to the desired design (including, but not limited to, the predefined cut lines) from the media drive 19 and instruct the portable cutting apparatus 10 to cut the desired design. The user interface 17 provides the user with a variety of ways to customize the desired design as described herein.

The processing apparatus 18, under control of one or more software program or routines, provides the user interface 17 and controls the portable cutting apparatus 10. The size of the processor of the processing apparatus may vary depending on the type of software used, features included in the user interface 17, and the level of control provided for the portable cutting apparatus 10. The processing apparatus 18 may also vary in size based on other parameters common to the processor industry and the type of peripheral devices included with or connected to the portable cutting apparatus 10. The processing apparatus 18 may access information from the information storage system or media drive 19. The storage media drive 19 may be located within a housing of the peripheral device 13, such as a hard drive, or may be accessed on a separate media device that can be read from media drive 19.

Figure 2:
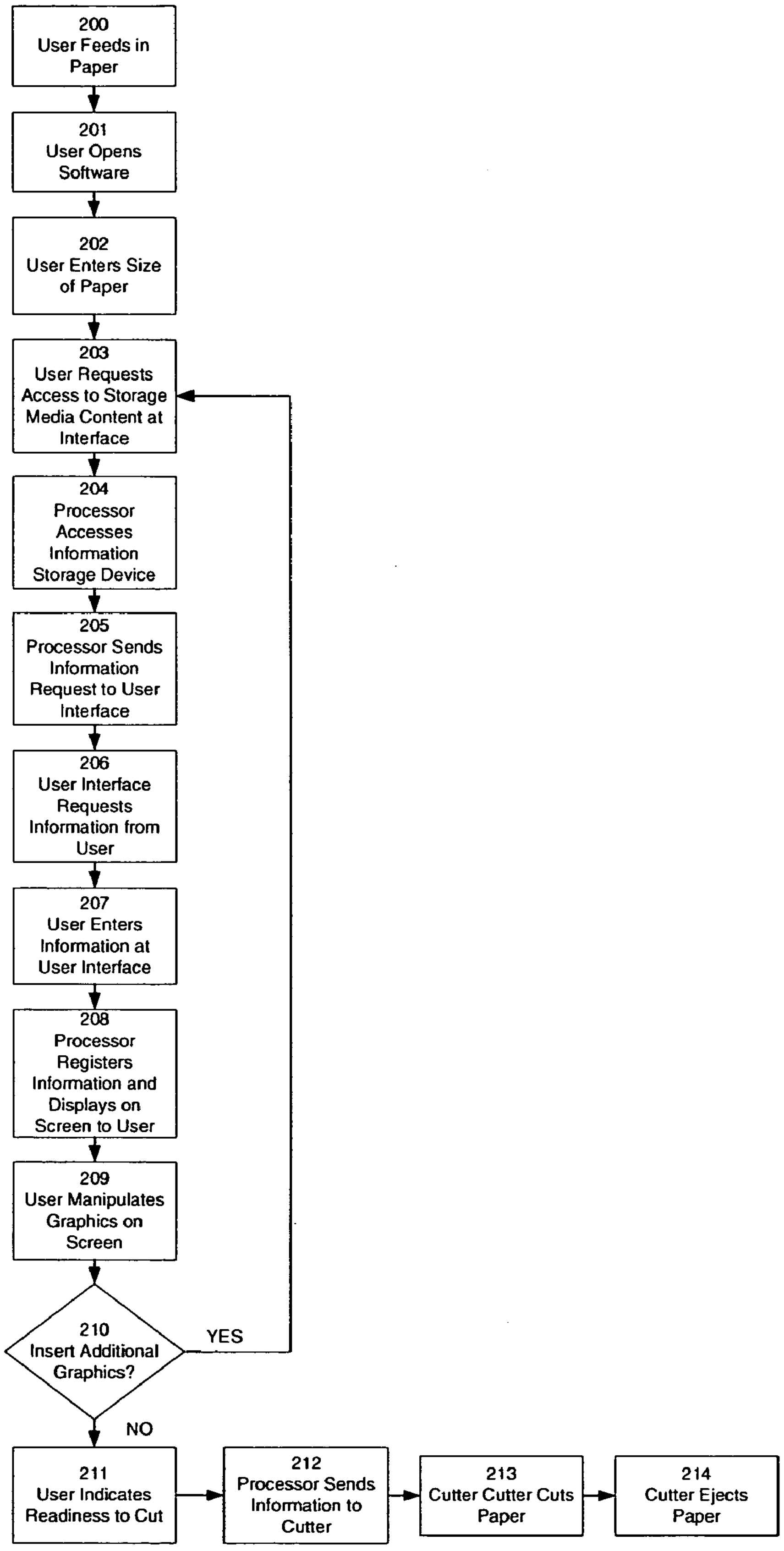
FIG. 2 shows one embodiment of an illustrative operational flowchart of a cutting system such as that shown in FIG. 1.

FIG. 2 provides one illustrative embodiment of an operational flowchart for the cutting system 1. It will be apparent to one skilled in the art that the operation of the various embodiments of cutting systems described herein (e.g., a cutting apparatus used with a personal computer or a standalone cutting system) is substantially similar in many ways.

As shown in FIG. 2, the user feeds a sheet of paper 14 into the cutting apparatus 10 through the paper input/output opening 27 in the housing 11 of the cutting apparatus 10 (block 200). The user opens the software program provided and presents a user interface to the user (block 201) and the user enters the size of the paper 14 (block 202).

At the request of the user (block 203), the processing apparatus 18 (e.g., as a part of the peripheral device 13 as shown in FIG. 1 or positioned within the cutter housing or attached through a cable or by a wireless connection to the cutter apparatus 10) then accesses the information storage device 19 (block 204) (e.g., information stored in memory contained in the cutter housing or information stored on a separate media device). The processing apparatus 18 then sends a request for input of information to the user interface (block 205). In one exemplary embodiment, the screen 21 on the user interface displays the information request to the user (block 206) and the user enters the requested information via the user interface (block 207).

The processing apparatus 18 registers the information entered and sends the design with predefined cut lines to the user interface for display on the screen 21 (block 208). The user then has the ability to move, size and rotate the design on the screen as desired (block 209). The user then has the choice to re-enter information or insert additional designs with predefined cut lines (block 210). If the user accepts the information as displayed and is ready to cut (block 211), the processor sends the information to the cutting apparatus 10 (block 212). The cutting apparatus 10 then cuts the design (block 213) and ejects the paper 14 with the cut design (block 214). If the user requires additional designs, the user returns to request access to the information on the storage media (blocks 203).

Figure 3:
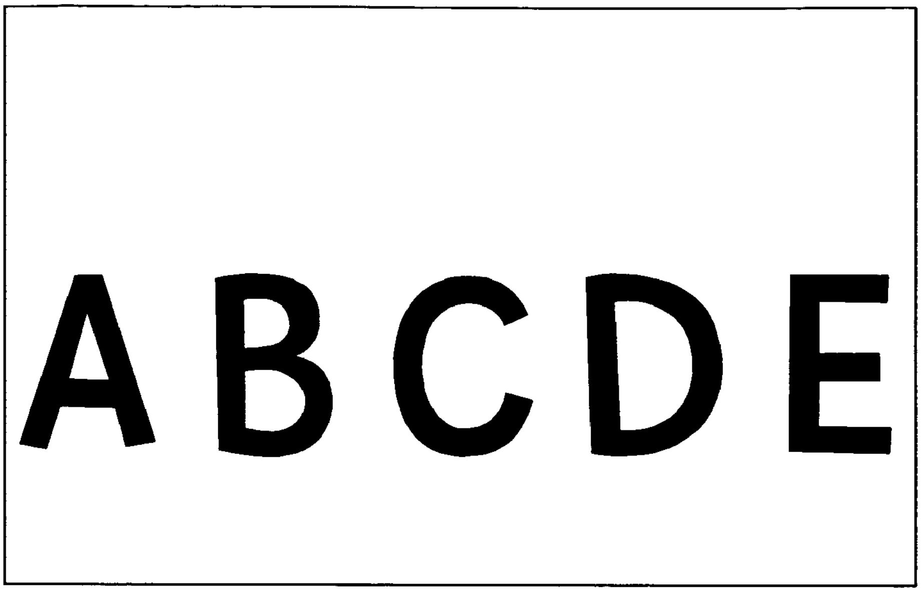
FIG. 3 is an image of text cut by a system such as that shown in FIG. 1, and placed on a separate sheet of material.

The user interface 17 allows the user to communicate with the processing apparatus. As such, the user can enter information or respond to requests from the processing apparatus (e.g., operating under the control of the software program) allowing the user to detail the design that the cutting apparatus 10 should cut. The user interface 17 includes, but is not limited to devices for entering information (generally shown by numeral 22), such as a keyboard, keypad, mouse, interactive screen, or other interface, and a screen 21 for displaying items, such as a menu and information entered by the user. FIG. 3 shows the graphical design entered into the cutting system 1 via the user interface 17 after the letters are cut and after application to a separate sheet of paper.

The information storage system provides graphical details concerning the nature of design that the user is allowed to select for cutting (e.g., fonts, shapes, non-geometric shapes, etc.). The information storage system may be housed, or otherwise provided, in the same housing with the cutting apparatus and/or processor, or the information may be stored on media that can be read from a media drive. One or more various types of storage systems may be used to provide the information, such as, read only memory, flash cards and associated software/hardware, compact discs and associated software, floppy disks and associated software/hardware, memory cards and associated software/hardware, etc. One skilled in the art will recognize that the information may be provided in one of numerous ways and the present invention is not limited to any particular media system listed, although one or more systems may provide additional benefits over other systems, e.g., portability.

The processing apparatus 18 provides the communication link between the information storage system 19 (e.g., a compact disc and drive system, a flash card system, etc.), user interface 17, and cutting apparatus 10. The processing apparatus 18 takes information from the information storage system and translates it such that the user is queried for information at the user interface 17. The processing apparatus 18 then takes the user entered information and translates it for display such that the user can view the information entered on a display screen 21. After acceptance of the layout by the user, the processing apparatus 18 translates the information so that the cutting apparatus 10 cuts the desired image (e.g., characters 15).

The paper cutting apparatus 10 is operable to cut sheet material including, but not limited to, paper, vellum, and other materials used on scrapbook pages and cards. In one embodiment, the cutting apparatus 10 is configured to receive sheet material having a size equal to, but no more than 10 inches wide. In another embodiment, the cutting apparatus 10 is configured to receive sheet material having a size equal to, but no more than 12 inches wide. In another embodiment, the cutting apparatus 10 is configured to receive sheet material having a size equal to, but no more than 39 inches in length. Yet further, in one embodiment, the cutting apparatus 10 is configured to receive sheet material having a size equal to, but no more 20 inches in length. Further, in one embodiment, the cutting apparatus 10 is configured to receive sheet material having a size greater than about 3 inches by 3 inches.

Generally, the cutting apparatus 10 includes the paper input/output opening 27 for receiving sheet material, as well as for providing the sheet material from the apparatus 10 after a cutting procedure is performed. One skilled in the art will recognize that any such opening, whether the same or different, can be used for receiving and outputting the paper, and that the present invention is not limited to any particular configuration thereof. However, having one opening may be beneficial in providing a portable standalone cutting system (see FIG. 8A).

Various sheet material alignment techniques may be included to align the sheet material as it passes through the cutting apparatus 10. For example, rails, tracks, paper wheels, or any other devices used for alignment in various paper manipulation devices may be used (e.g., those used in printers, cutters, copiers, etc.).

Further, the cutting apparatus 10 includes a controllable cutting mechanism (e.g., a blade, pin, etc.) for providing the desired cutting of the sheet material as it passes through the apparatus 10. The cutting mechanism (e.g., mounted in the housing 11) is controlled along multiple axes by the software associated with the processing apparatus 18 for providing the cutting function. For example, the processing apparatus generates a cutting signal representative of cut lines associated with a user defined graphical design. One skilled in the art will recognize that the translation of the cut information to cut signal for controlling the cutting mechanism may take one of various forms, and that the present invention is not limited to any particular technique or design. However, at least in one embodiment of the present invention, predefined fonts and predefined shapes are provided (e.g., stored on media usable with the information storage system) with predefined cut lines associated therewith. As such, the processing apparatus translates such predefined cut lines to coordinates for generation of the cut signal for control of cutting by the cutting apparatus.

Still further, the apparatus 10 may include suitable apparatus for controlling one or more cutting parameters. For example, the pressure of the cutting mechanism on sheet material may be controllable to allow for adjustment of, for example, the cutting depth.

Figure 9:
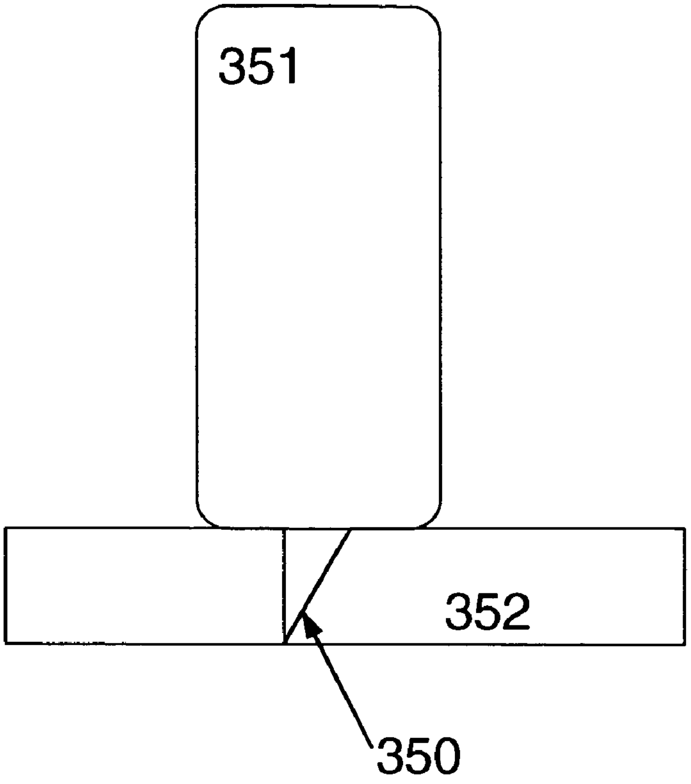
FIG. 9 is a representation of typical cutting blade and housing used for the cutting of vinyl.

FIG. 1 shows the paper 14 fed into the portable cutting apparatus 10 with cut letters 15 on the outlet side of the portable cutting apparatus 10. The cutting mechanism for the cutting apparatus 10 located inside the housing 111 may include, but is not limited to, a blade as shown in FIG. 9, or a set of blades, a laser, a rotating mill head, or a set of pins.

In one exemplary embodiment, the paper cutting apparatus may be substantially similar to a cutting apparatus provided under the trade designation Craft-ROBO and/or CC100-20, and available from Graphtec Corporation or Western Graphtec Inc. (Irvine, Calif.). Further, for example, the software available for controlling operation of the Craft-ROBO and/or CC100-20 cutting apparatus may be modified according to the present invention.

According to one embodiment of the present invention, the cutting apparatus 10 may be controllable under a basic mode of system operation (e.g., under software control). For example, under the basic mode of operation, a selected and limited number of predefined fonts and predefined shapes are available to create graphical designs to be cut using the cutting system 1.

For example, one or more different predefined fonts and/or one or more predefined shapes (e.g., non-geometric shapes such as balloons, sheep, or any other non-geometric shape), or groups of shapes, may be stored on one or more different types of media that may be read using the information storage system 19 by processing apparatus 18. For example, one or more groups of predefined non-geometric shapes may be provided. In other words, a group of shapes related to birthdays, a group of shapes related to months of the year, a group of shapes related to a movie, or any other group of related shapes may be formed and stored together on a storage media for access thereto.

Each of the fonts and shapes has associated therewith cut lines that define the fonts and shapes to be used in the cutting process (e.g., cut lines that equate to the border of a letter or shape along which the letter or shape is to be cut). Such cut lines can be used by the processing apparatus to provide the cut signal for control of the cutting apparatus. The cut lines may be translatable, or otherwise manipulated, in size, by the processing apparatus as the user defines the size of, for example, text or shapes.

In one embodiment, fonts and shapes may be, for example, stored using compact flash cards. The flash cards may be used with a Sandisk PCMCIA to Compact Flash Adapter (e.g., that fits into laptop card slot) or a Sandisk USB Compact Flash Adapter (e.g., that plugs into USB port) to provide the processing apparatus 18 with accessible information. Each flash card, for example, may include a font set or a group of shapes.

In the basic mode of operation, the cutting apparatus 10 may be limited to cutting text (i.e., letters, numbers and characters typically included in fonts) having the desired predefined font and/or cutting predefined shapes (i.e., objects that are not letters, numbers and characters typically included in fonts) available on such storage media. For example, in basic operation, the flash card would be inserted in the card reader for access by the processing apparatus 18. In one embodiment, each of a plurality of storage media is configured to store at least one predefined font or at least one group of predefined non-geometric shapes.

The user, via the user interface, is allowed to insert text (i.e., letters, numbers and characters typically included in fonts) or shapes (e.g., non-geometric shapes from a group of related shapes) in a graphical design using one of the predefined fonts or predefined shapes. For example, the user may be allowed to insert text in the graphical design and select a font for such text. Further, for example, the user may be presented with a menu including the plurality of predefined non-geometric shapes available and then be allowed to select one or more of such presented predefined shape (e.g., such as by selecting an icon representative of the shape, for example, by a pull down menu).

Yet further, the user may be allowed to manipulate such text or shapes. For example, the user may be allowed to size the text and/or non-geometric shapes by dragging a portion (e.g., a corner) of an insertion region that contains the user's selection. Further, the user may be allowed to rotate or otherwise move the text or shapes, so as, for example, to form a string of letters or numbers.

As such, using the predefined fonts and/or predefined shapes, a user is able to define a graphical design that the user desires to cut from the sheet material. As used herein, graphical design refers to any design created by a user and is not limited to any particular design. However, in one embodiment of the basic mode, only designs created with the predefined fonts available and/or predefined shapes available can be cut.

The designs created with the fonts and/or shapes that are selected are brought to the user interface along with the associated cut lines for such fonts and shapes (e.g., the cut lines are stored with the shape on the media). As such, at least in one embodiment, the user does not create cut lines for the design using the user interface which simplifies use of the system. The cut lines associated with the designs are defined lines used by the processing apparatus 18 to control the cutting apparatus for cutting the user defined graphical design.

Once the graphical design is created via the user interface 17, the processing apparatus 18 would communicate with the cutting apparatus 18 (e.g., upon instruction from the user) to cut the shape, using the cut lines associated therewith. As one skilled in the art would recognize, an origin or reference point of the design may be established to allow calculation of all necessary coordinates for controlling the cutting process. While the shape, letters, or numbers are being cut, the user could perform other tasks.

Providing such a basic mode of operation allows almost any user the ability to easily learn to use the system. Also, with use of such a basic mode of operation, processing apparatus 18 may be incorporated into a housing along with the cutting apparatus 10 as shown in the standalone embodiment of FIG. 8A. This allows for further portability of the cutting system.

One or more embodiments of cutting systems described herein are compact, portable, easy to use, and/or allow a user to cut various fonts and non-geometric shapes of multiple or infinite sizes. In one embodiment of the present invention, the user interface 17, information storage media system (e.g., readable media and drive 19), and the processing apparatus 18 are a part of the external peripheral device 13. The user interface 17 may include a simplified software tailored to individual consumers allowing insertion of text and predetermined non-geometric shapes simply by clicking on an icon and choosing the font or shape to be inserted. In an equally simple manner, the user can size the letters or shapes by dragging the corner of the insertion box.

Various other more advanced modes may be used with the basic mode of operation. For example, a print and cut feature to create designs to be cut using the cutting system 1 may be used in combination therewith. For example, using the user interface 17, in one or more embodiments, a user may select a file including an image from which the user wishes to cut a circle portion of the image. The image would be brought to the screen 21 and a circle inserted thereon indicating the circular portion of the image to be cut. Further, a cut line would be defined thereon along with registration marks to be used in control of the cutting operation. The image would then be printed with the cut line and registration marks. The printed image would be input to cutting apparatus 18 and the circular portion of the image cut. Such an advanced print and cut feature is substantially similar to that available with use of the software that accompanies the Craft-ROBO cutting apparatus available from Graphtec Corp.

Typically, the paper to be cut would be laminated with a transfer adhesive and liner to hold the letter(s) or shape(s) in place as the material was being cut. If it was not desired to have adhesive on the cut shapes or letters, a sheet with a repositionable type of adhesive (e.g., a pressure sensitive adhesive, such as that used on Post-it™ notes) could be used in place of the transfer adhesive and liner. In this way, the material could be cut and the shape, letter, or number then removed from the sheet without adhesive.

Paper, vellum, and other materials used for scrapbooking and card making vary in density and thickness. To accommodate the different materials, the user may be required to change the cutting blade depth and cutting pressure. Since the cutting apparatus is for use by an individual, the settings for pressure and blade depth are preferably predetermined and easily adjusted by the user to the predefined settings.

Beyond scrapbooking and card making, the cutting apparatus 18 may be used in other non-industrial applications where the cutting of sheet material (e.g., paper) is desired. For example, teachers (e.g., in schools, daycares, and churches) often use dies and templates to cut letters and shapes for bulletin boards. A set of dies for cutting letters is expensive and the cutting process is time consuming. The use of templates is also very time consuming. The use of an automated cutting system with a user interface would minimize the time and expense required to cut letters or shapes. In addition, multiple fonts and sizes could be specified as desired for the cut letters or shapes. In this application, the use of a small cutter would allow individual teachers to have or move the cutting system to their teaching area. In another embodiment, the cutter could be connected to a computer at a central location and accessed in that way.

The entire cutting operation may be portable as the cutting apparatus 10 can be carried anywhere and then connected to a processing apparatus at that location. Increased portability could be obtained by embodiments of the present invention in which the process would be contained in the portable cutter housing as shown and described with reference to FIG. 8A. For example, in one embodiment of the present invention, the peripheral device 13 (e.g., including at least a user interface 17, an information storage system, and a processing apparatus 18) are contained in a portable cutter housing making them a standalone unit. Via the user interface 17, the user would direct the processor to access stored information (e.g., fonts and shapes) and instruct the cutter to cut the desired letters or shapes. In addition, the portable cutting apparatus 10 can be wirelessly connected to a computer or any type of network that contains a processor for controlling the cutting apparatus 10. To further increase the portability of the cutting apparatus 10, it could operate using either battery or AC power. In one preferred embodiment, the cutting system is less than 20 lbs and compact enough to fit into a small bag.

Figure 4:
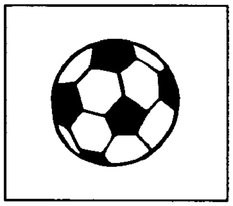
FIG. 4 shows an image of a design cut by a system such as that shown in FIG. 1, and placed on a separate sheet of material.

FIG. 4 shows one example (e.g., a soccer ball) of many possible designs that could be cut by the present invention as it might appear after application to a separate sheet of paper. Designs may be created using the software simply by clicking on a shape or text icon (e.g., representative of those available for selection having cut lines associated therewith). The design is then selected and placed on the screen such as to locate the design on the medium for cutting. The user simply clicks on the screen to place the design and selects the corner of the design to increase or decrease the size of the design. In this manner, intricate designs such as, but not limited to, animals, leaves, lace, and figures can be cut in any size out of the user specified media with the click of a button. In addition, designs of multiple colors can be created by cutting various parts of a design from different color media.

Figure 5A:
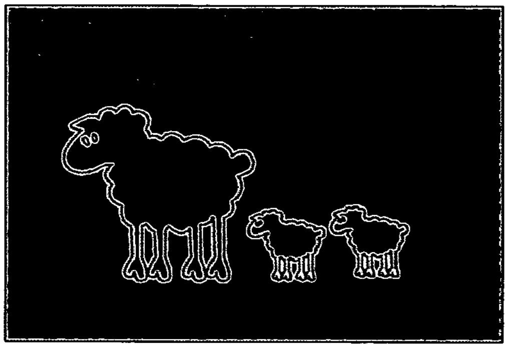
FIGS. 5A–5C show a series of three images comprising two separate designs cut and assembled to make one design; such design cuts may be performed by a system such as that shown in FIG. 1.
Figure 5B:
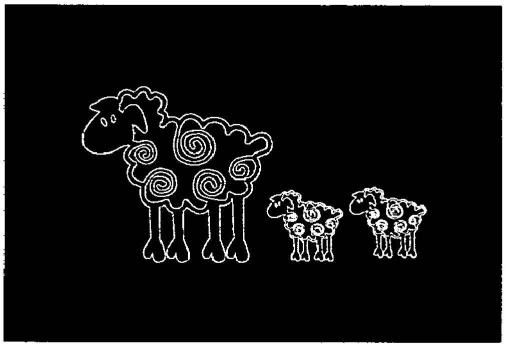
Figure 5C:
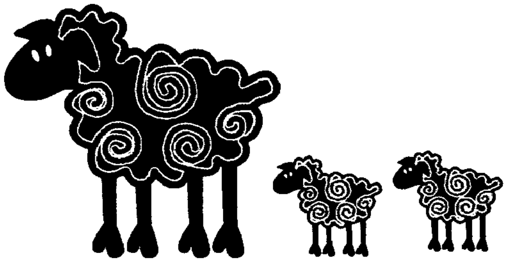

FIGS. 5A–5C illustrate the ability of the user to create complicated designs in any size. FIG. 5C shows the final design after the user inserts the two parts of the sheep design and sizes them as desired. The user creates the designs by merely clicking on an icon, selecting the two parts of the design, and placing them on their screen. The images can then be sized and copied. Once the user is satisfied with the sizes of the design, the design is sent to the portable cutter in two steps. The first step would cut the design in FIG. 5A out of a first media A. The second step would cut the design in FIG. 5B out of a second media B. The user then assembles the pieces from FIG. 5B on top of the pieces from FIG. 5A and places them on a separate media to obtain the design shown in FIG. 5C.

Figure 6:
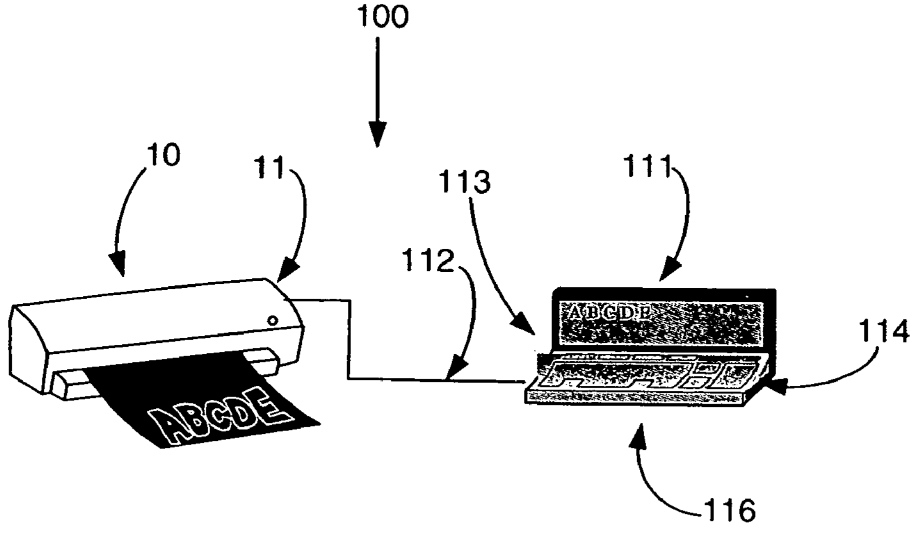
FIG. 6 is an illustration of a second embodiment of a portable paper cutting apparatus for use in producing custom cut images that is connected to another external peripheral device in accordance with the present invention.

Another embodiment of a cutting system 100 is shown in FIG. 6. In the system 100 of FIG. 6, a peripheral device that includes a portable module 111 is connected to the portable cutting apparatus 10 via a cable 112. This allows the user to operate the portable cutting apparatus 10 whether or not it is hooked up to a desktop computer or laptop computer. The portable module 111 houses the user interface 116, the processing apparatus 113, and a media drive system 114.

Figure 7:
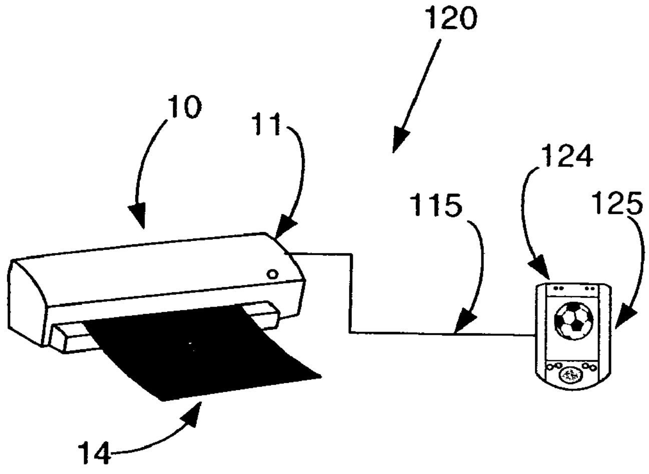
FIG. 7 is an illustration of a third embodiment of a portable paper cutting apparatus for use in producing custom cut images that is connected to yet another external peripheral device in accordance with the present invention.

Another embodiment of a cutting system 120 is shown in FIG. 7. In the system 120 of FIG. 7, a peripheral device that includes a hand held computer 124 is connected to the portable cutting apparatus 10 by a cable 115. This again allows the user to operate the cutting apparatus 10 whether or not it is hooked up to a desktop computer or laptop computer. The hand held computer 124 could communicate with the portable cutting apparatus 10 wirelessly allowing cutting without use of the cable 115. The display 125 on the hand held computer shows the design of FIG. 4 entered therein.

To further increase the portability of the cutter, FIG. 8A shows one embodiment of a standalone portable cutting system 150. The cutting system 150 includes a cutter housing 154 that contains (i.e., has integrated therewith or within) at least a user interface 160 (e.g., portions of which are integrated with the housing forming a part thereof), a processor 156, and a media drive 166. The user interface 160 includes a keyboard 162 and a screen 161 which are integral with the housing 10, although they may also be detachable.

Figure 8B:
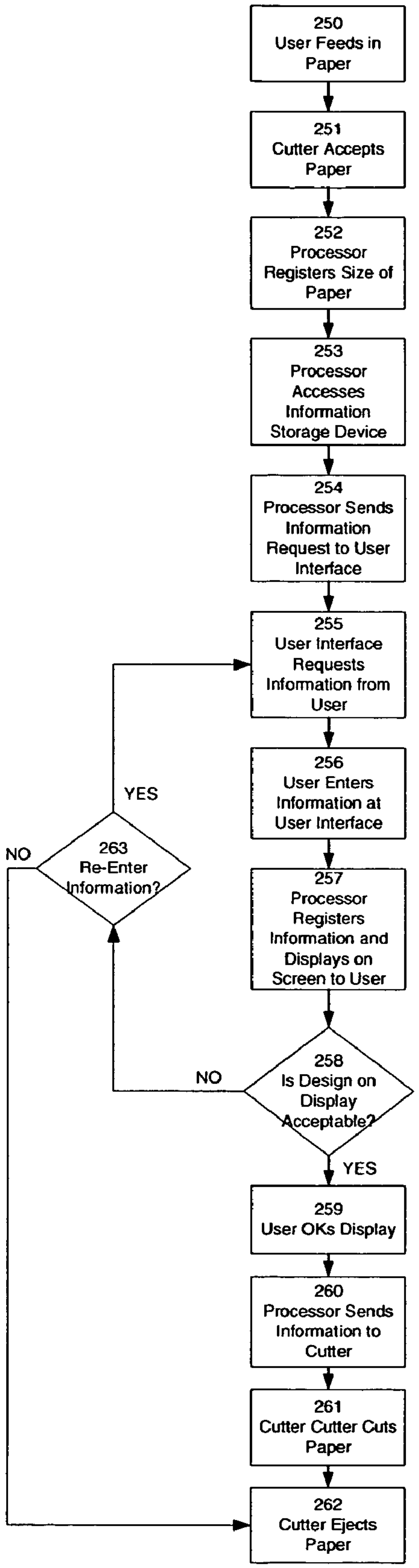
FIG. 8B shows one embodiment of an illustrative operational flowchart of a cutting system such as that shown in FIG. 8A.

FIG. 8B shows one embodiment of an illustrative operational flowchart of a cutting system such as that shown in FIG. 8A. As shown in FIG. 8B, the user feeds a sheet of paper 14 into the cutting system 150 through a paper input/output opening in the housing 154 of the cutting system 150 (block 250). The cutting system 150 accepts the paper (block 251) and the processing apparatus 156 registers the size of the paper (block 252).

The processing apparatus 156 (e.g., positioned within the housing 154) then accesses the information storage device 166 (block 253) (e.g., information stored in memory contained in the housing or information stored on a separate media device). The processing apparatus 156 then sends a request for input of information to the user interface (block 254). In one exemplary embodiment, the screen 161 on the user interface displays the information request to the user (block 255) and the user enters the requested information via the user interface (block 256).

The processing apparatus 156 registers the information entered and sends the design with predefined cut lines to the user interface for display on the screen 161 (block 257). The user then has the ability to move, size and rotate the design on the screen as desired. The user is then requested to accept the displayed design (block 258). If the user accepts the information as displayed and is ready to cut (block 259), the processor sends the information to the cutting apparatus 150 (block 260). The cutting apparatus 150 then cuts the design (block 261) and ejects the paper 14 with the cut design (block 262). If the displayed design is not acceptable, then the user is requested to reenter information (block 263) via the user interface (block 255) or choose to eject the paper (block 262).

In the cutting of printed paper, the base paper color is often white and the printing can be the full range of colors. When the paper is cut with a sharp blade the color of the base paper (e.g., white) is sometimes undesirably visible. Therefore, one may see the benefit of the integration of a slight compression mechanism surrounding the blade (see FIG. 10) or that travels slightly ahead of the blade (see FIG. 11) that would compress the edge of the paper at the cutting blade during the cutting operation to prevent the white paper fibers from showing.

FIG. 9 shows a housing 351 with a cutting blade 350 that is typical of what is conventionally used in the vinyl sign industry. The housing 351 rides directly on top of the vinyl film 352 to be cut.

Figure 10:
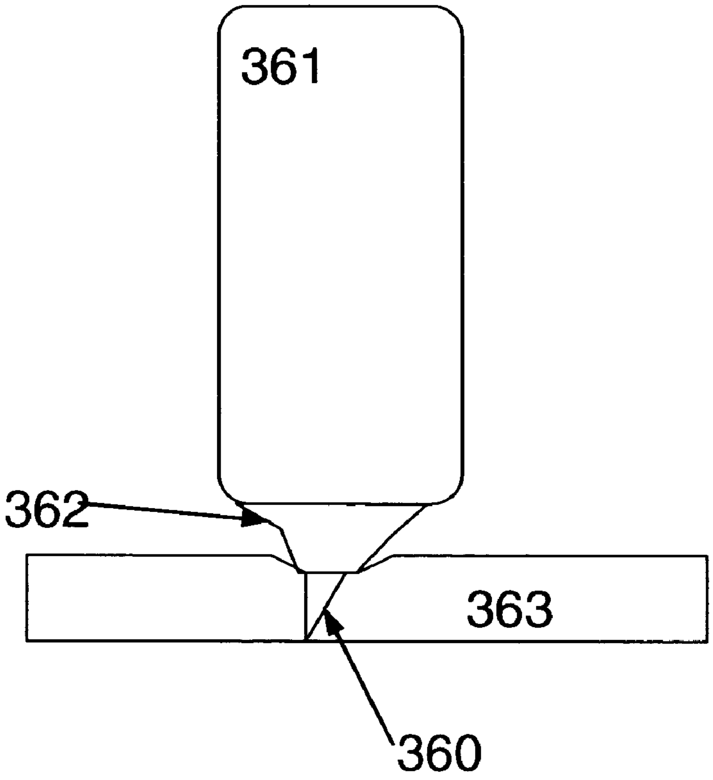
FIG. 10 shows one illustrative embodiment of a representation of a cutting blade and housing where the housing also acts as a compression mechanism.

FIG. 10 shows a modification to a typical cutting blade 360 whereby the blade housing 361 extends down around the blade to act as a compression mechanism 362 for the paper 363, which is compressible. It is desirable to slightly compress the edges of the paper since printed paper usually has a white core.

Figure 11:
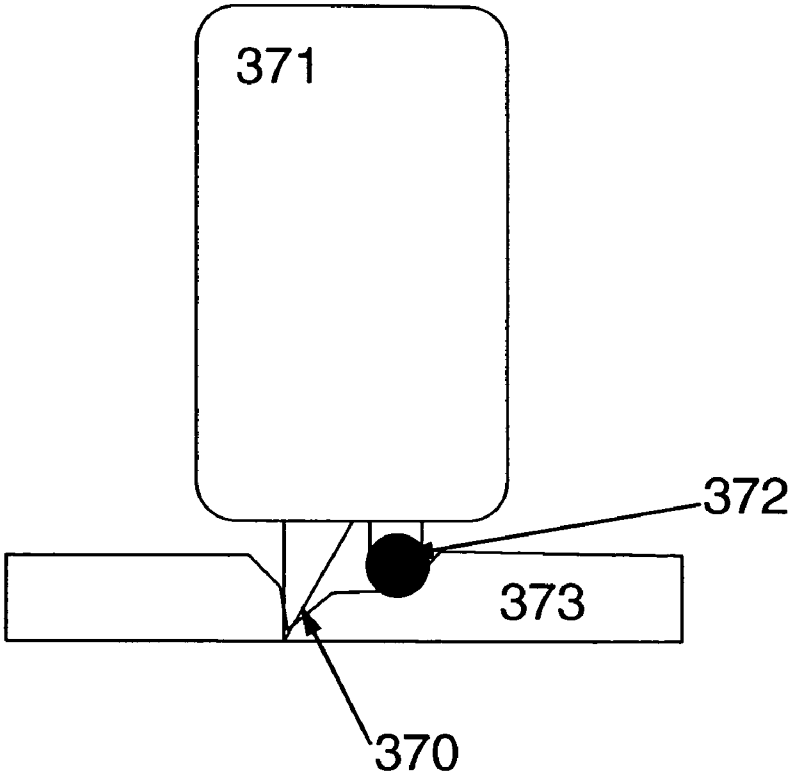
FIG. 11 shows another illustrative embodiment of a representation of a cutting blade and housing where a compression mechanism separate from the housing is provided.

FIG. 11 shows another embodiment of a cutting blade 370 with a compression mechanism 372 (e.g., a round mechanism). In this embodiment the cutting blade 370 and compression mechanism 372 are located in the same housing 371 but are separate mechanisms. Further, in this embodiment the compression mechanism may be, but is not limited to, a small wheel that travels ahead of the cutting blade. The paper 373 is compressed by the compression mechanism and then cut by the blade.

Figure 12:
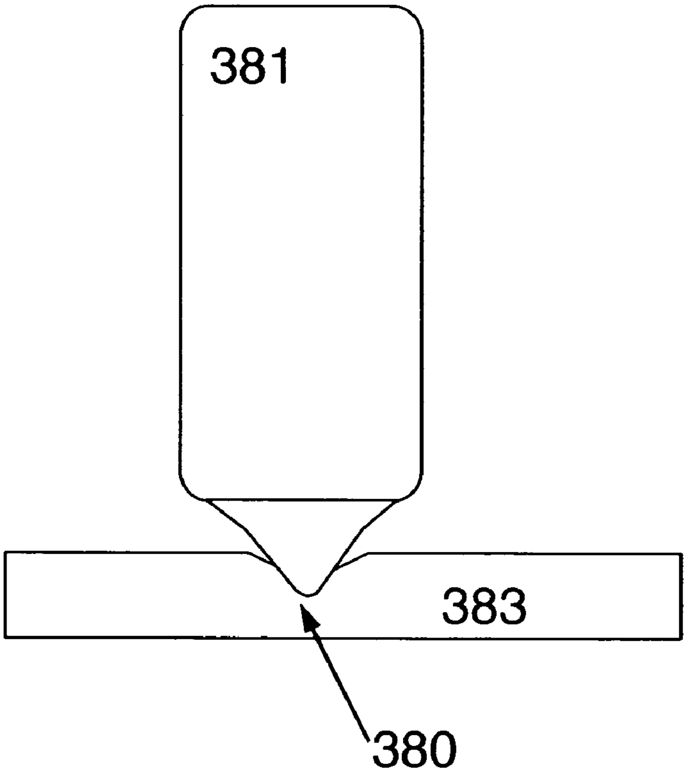
FIG. 12 shows an illustrative embodiment of a representation of a compression mechanism that could replace a blade in the cutter to allow compression, and in particular, embossing of the media.

FIG. 12 shows an independent compression mechanism 380. In this embodiment, the compression mechanism 380 is located in a separate housing 381 from the cutting mechanism. The paper 383 is compressed by the compression mechanism 380 independent of the cutting mechanism. In this embodiment, it would be possible to use, first, a compression operation and, second, a cutting operation with a method of registration for both operations so that misalignment would not occur. If the two operations were independent of each other but performed on the same apparatus, the apparatus could select the compression mechanism or cutting mechanism as desired in the same way plotters select colored pens.

The use of a separate compression mechanism would allow features to be embossed thus adding dimension to the image. For example, just as described with respect to cut lines, embossing lines may also be stored with fonts and/or shapes (e.g., non-geometric) shapes. In such a manner, an embossing signal may be generated by the processing apparatus for a graphical design created by a user. The embossing function may be used alone or in combination with the cutting feature. For example, a graphical design may be embossed using embossing lines associated with a shape, and thereafter, the embossed shape may be cut based on the cut lines for the predefined shape. Further, just as the cut lines are stored with the predefined fonts and shapes, the embossing lines may also be so associated therewith and stored for access by the processing apparatus.

All patents, patent documents, and references cited herein are incorporated in their entirety as if each were incorporated separately. This invention has been described with reference to illustrative embodiments and is not meant to be construed in a limiting sense. As described previously, one skilled in the art will recognize that other various illustrative applications may use the techniques as described herein. Various modifications of the illustrative embodiments, as well as additional embodiments to the invention, will be apparent to persons skilled in the art upon reference to this description.

What is claimed is:

1. A method for cutting sheet material comprising:

providing a cutting apparatus operable to cut sheet material under control of a processing apparatus;

providing at least one of one or more predefined fonts and a plurality of predefined shapes stored on readable media with one or more associated predefined cut lines and one or more predefined emboss lines;

providing a user interface to a user, wherein the user interface allows a user to insert at least one of text and one or more shapes in a graphical design using the one or more predefined fonts and the plurality of predefined shapes, wherein the graphical design is defined by one or more cut lines and one or more emboss lines based on the one or more cut lines and the one or more emboss lines associated with the one or more predefined fonts and the plurality of predefined shapes;

inserting sheet material into the cutting apparatus;

compressing the sheet material under control of a compress signal generated by the processing apparatus that is representative of the one or more emboss lines defined for the graphical design; and cutting the graphical design defined by the cut lines under control of a cut signal generated by the processing apparatus that is representative of the one or more cut lines defined for the graphical design, wherein the one or more emboss lines are the same as the one or more cut lines.

2. A pattern cutting apparatus for cutting patterns out of sheet material, the apparatus comprising:

a housing;

a cutting mat having a base substrate and an adhesive layer disposed on the base substrate for holding the sheet material in a fixed position relative to the base substrate while a pattern is cut from the sheet material, the adhesive layer being formed of a repositionable adhesive that is bonded to the base substrate such that after cutting, the pattern cut from the sheet material can be removed from the base substrate without the adhesive layer;

a cutting blade, the cutting blade and cutting mat being movable relative to one another in three orthogonal directions; and a controller operatively connected to at least one of the cutting blade and cutting mat to move the cutting blade and cutting mat relative to one another in the three orthogonal directions to cut the sheet material.

3. The pattern cutting apparatus of claim 2, wherein the three orthogonal direction comprise x-, y-, and z- directions, and wherein the pattern cutting apparatus comprises a plotter-type apparatus what allows the cutting blade to move in y- and z- directions and allows the cutting mat to move in the x- direction.

4. A method of cutting sheet material using a pattern cutting apparatus, the cutting apparatus comprising:

a housing;

a cutting mat having a base substrate and an adhesive layer disposed on the base substrate for holding the sheet material in a fixed position relative to the base substrate while a pattern is cut from the sheet material, the adhesive layer being formed of a repositionable adhesive that is bonded to the base substrate;

a cutting blade, the cutting blade and cutting mat being movable relative to one another in three orthogonal directions; and a controller operatively connected to at least one of the cutting blade and cutting mat to move the cutting blade and cutting mat relative to one another in the three orthogonal directions to cut the sheet material, the method comprising:

removably adhering the sheet material on the adhesive layer of the cutting mat;

driving at least one of the cutting blade and cutting mat to move the cutting blade and cutting mat relative to one another in the three orthogonal directions to cut the sheet material into a desired shape; and removing the cut sheet material from the cutting mat without the adhesive layer.

5. The method of claim 4, wherein driving at least one of the cutting blade and cutting mat to move the cutting blade and cutting mat relative to one another comprises:

driving the cutting blade in the y- and z- directions; and driving the cutting mat in the x- direction.

6. A pattern cutting apparatus for cutting patterns out of sheet material, the apparatus comprising:

a housing;

a sheet material assembly consisting essentially of:

(a) a sheet material to be cut, and (b) a cutting mat having a base substrate and an adhesive layer disposed on the base substrate, the adhesive layer holding the sheet material in a fixed position relative to the base substrate, the adhesive layer being formed of a repositionable adhesive that is bonded to the base substrate such that after cutting, a pattern cut from the sheet material can be removed from the base substrate without the adhesive layer;

a cutter, the cutter and sheet material assembly being movable relative to one another in three orthogonal directions; and a controller operatively connected to at least one of the cutter and sheet material assembly to move the cutter and sheet material assembly relative to one another in the three orthogonal directions to cut the sheet material.

7. The pattern cutting apparatus of claim 6, wherein the three orthogonal direction comprise x-, y-, and z- directions, and wherein the pattern cutting apparatus comprises a plotter-type apparatus what allows the cutter to move in y- and z- directions and allows the sheet material assembly to move in the x- direction.

8. The pattern cutting apparatus of claim 6, wherein the cutter comprises a cutting blade.

9. A method of cutting sheet material using a pattern cutting apparatus, the cutting apparatus comprising:

a housing;

a sheet material assembly consisting essentially of:

(a) a sheet material to be cut, and (b) a cutting mat having a base substrate and an adhesive layer disposed on the base substrate, the sheet material being adhered to the adhesive layer to hold the sheet material in a fixed position relative to the base substrate, the adhesive layer being formed of a repositionable adhesive that is bonded to the base substrate;

a cutter, the cutter and sheet material assembly being movable relative to one another in three orthogonal directions; and a controller operatively connected to at least one of the cutter and sheet material assembly to move the cutter and sheet material assembly relative to one another in the three orthogonal directions to cut the sheet material, the method comprising:

driving at least one of the cutter and sheet material assembly to move the cutter and sheet material assembly relative to one another in the three orthogonal directions to cut the sheet material into a desired shape; and removing the cut sheet material from the cutting mat without the adhesive layer.

10. The method of claim 9, wherein driving at least one of the cutter and sheet material assembly to move the cutter and sheet material assembly relative to one another comprises:

driving the cutter in the y- and z- directions; and driving the sheet material assembly in the x- direction.

11. The method of claim 9, wherein the cutter comprises a cutting blade.

* * * * *